United States Patent [19]

Franke

[11] 4,225,788
[45] Sep. 30, 1980

[54] X-RAY DIAGNOSTIC GENERATOR COMPRISING AN INVERTER FEEDING THE HIGH VOLTAGE TRANSFORMER

[75] Inventor: Kurt Franke, Erlangen, Fed. Rep. of Germany

[73] Assignee: Siemens Aktiengesellschaft, Berlin & Munich, Fed. Rep. of Germany

[21] Appl. No.: 960,859

[22] Filed: Nov. 15, 1978

[30] Foreign Application Priority Data

Jan. 20, 1978 [DE] Fed. Rep. of Germany ....... 2802450

[51] Int. Cl.$^2$ .............................................. H05G 1/30
[52] U.S. Cl. .................................... 250/408; 250/402
[58] Field of Search ............... 250/402, 401, 403, 408, 250/421, 409; 315/244, 290; 363/58, 36

[56] References Cited

U.S. PATENT DOCUMENTS

| | | |
|---|---|---|
| 3,320,477 | 5/1967 | Boeker .................................. 250/421 |
| 3,828,194 | 8/1974 | Grasser ................................ 250/402 |

FOREIGN PATENT DOCUMENTS 2443709 3/1976 Fed. Rep. of Germany.

Primary Examiner—Alfred E. Smith
Assistant Examiner—Thomas P. O'Hare
Attorney, Agent, or Firm—Hill, Van Santen, Steadman, Chiara & Simpson

[57] ABSTRACT

In an exemplary embodiment an inverter manifests a circuit for the alternate connection of the terminals of an LC oscillatory circuit with the poles of a d.c. voltage source. The primary winding of the high voltage transformer is connected in series with the capacitor to form the LC oscillatory circuit. By this means, a short-circuit proof state of the inverter results.

1 Claim, 1 Drawing Figure

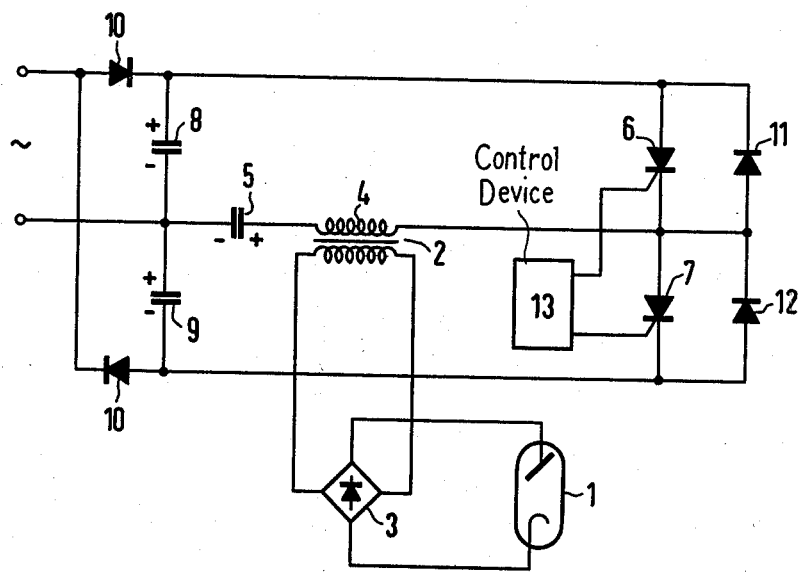

X-RAY DIAGNOSTIC GENERATOR COMPRISING AN INVERTER FEEDING THE HIGH VOLTAGE TRANSFORMER

BACKGROUND OF THE INVENTION

The invention relates to an x-ray diagnostic generator comprising an x-ray tube, a high voltage transformer feeding the x-ray tube, an inverter connected to the input of the high voltage transformer, and a power rectifier feeding the inverter.

In the case of an x-ray diagnostic generator of this type, it is possible to select the feed frequency of the x-ray tube high voltage transformer in the kHz-range; i.e., substantially higher than the mains frequency. On account of this high feed frequency, the high voltage transformer can be provided with a substantially smaller and more lightweight construction than in the case of an x-ray diagnostic generator which is operated with the mains frequency.

SUMMARY OF THE INVENTION

The object underlying the invention consists in disclosing a circuit for the inverter of an x-ray diagnostic generator of the type initially cited which, while having a simple construction, is short-circuit proof; i.e., wherein an endangering of semiconductor switching elements in the case of a short circuit in the load circuit is impossible.

In accordance with the invention, this object is achieved by virtue of the fact that the inverter manifests a circuit for the alternate connection of the terminals of an LC oscillatory circuit with the poles of a d.c. voltage source, wherein the primary winding of the high voltage transformer is connected in series with the capacitor. In the inventive x-ray diagnostic generator, very few components are required for the construction of the inverter. If a short circuit occurs in the load circuit, the capacitor connected in series with one of the circuit elements, respectively, connecting the oscillatory circuit with the feed voltage source, prevents a destruction of the switching elements, which are preferably thyristors.

The invention shall be explained in greater detail in the following on the basis of an exemplary embodiment illustrated in the accompanying sheet of drawings; and other objects, features and advantages will be apparent from this detailed disclosure and from the appended claim.

BRIEF DESCRIPTION OF THE DRAWING

The single FIGURE shows an electric circuit diagram for an exemplary embodiment of the invention.

DETAILED DESCRIPTION

In the drawing, an x-ray tube 1 is illustrated which is fed by a high voltage transformer 2 via a high voltage rectifier 3. The primary winding 4 of the high voltage transformer 2 is connected in series with a capacitor 5. An oscillatory circuit is thereby formed which consists of capacitor 5 and the primary leakage inductance of the high voltage transformer 2. This oscillatory circuit is alternately connected, via two thyristors 6 and 7, to the two capacitors 8 and 9, which are charged with the designated polarity by the alternating current mains via a rectifier circuit 10. Free-running or by-pass diodes 11 and 12 are connected in parallel with the thyristors 6 and 7.

If, by the way of example, the thyristor 6 is ignited (rendered conductive) by a control device 13, then capacitor 5 is charged with the indicated polarity; namely, to a voltage which, on the basis of the leakage inductance of the high voltage transformer 2, lies above the voltage of capacitor 8. Thyristor 6 is extinguished if the charging current has become zero. Following this point of time, the voltage at capacitor 5—which is higher in comparison with the voltage at capacitor 8—drives a discharge current via free-running diode 11. This discharge current becomes zero if the voltages at capacitors 5 and 8 are of equal size. Accordingly, a voltage half-wave (or alternation) is connected to the primary winding 4 of the high voltage transformer 2. If thyristor 7 is now ignited by the control device 13, capacitor 5 is charged to a voltage lying above the voltage of capacitor 9, said voltage having a polarity which is opposite as compared with the indicated polarity, and the described operations are repeated in an analogous fashion in conjunction with the free-running diode 12. Accordingly, a second half-wave (or alternation) of opposite polarity follows the first half-wave (or alternation) at the primary winding 4. Upon ignition of thyristor 6, there again follows a half-wave (or alternation) which is of the same polarity as the first half-wave (or alternation), etc.

The frequency of the feed voltage of the high voltage transformer 2 is adjustable through determination of the ignition times of the thyristors 6 and 7. Capacitors 8 and 9 ensure a smoothed (or filtered) input voltage of the inverter 4 through 7, 11, 12, such that the peak voltage at primary winding 4 and hence at x-ray tube 1 is largely constant.

Since the leakage inductance of the high voltage transformer 2 is utilized to provide the inductive component of the oscillatory circuit, the inverter is very simple in its construction. If a short circuit occurs in the load circuit, the capacitor 5, connected in series with the thyristors 6 and 7, respectively, prevents a destruction of these thyristors.

It will be apparent that many modifications and variations may be effected without departing from the scope of the novel concepts and teachings of the present invention.

I claim as my invention:

1. An x-ray diagnostic generator comprising an x-ray tube, a high voltage transformer feeding the x-ray tube, an inverter connected to the input of the high voltage transformer, and a d.c. voltage source comprising power rectifier means feeding the inverter, characterized in that the inverter has a circuit (6, 7) for the alternate supply of voltage from the respective poles of the d.c. voltage source (8, 9), and said generator further comprising a capacitor (5) and a primary winding (4) of the high voltage transformer connected in series and forming an LC oscillatory circuit for connection with the d.c. voltage source (8, 9) under the control of said circuit (6, 7), said circuit having first means (6) operable in a first phase of operation of the invertor for connecting said primary winding (4) and said capacitor (5) in series with a first pole of the d.c voltage source for charging of the capacitor (5) with one polarity from said first pole of the d.c. voltage source and with the capacitor charging current flowing in one direction in the primary winding (4), and said circuit having second means (7) operable in a second phase of operation of the inverter for connecting said primary winding (4) and said capacitor (5) in series with a second pole of said d.c. voltage source for charging of the capacitor (5) with an opposite polarity opposite to said one polarity from said second pole of the d.c. voltage source and with the capacitor charging current during charging of said capacitor (5) to said opposite polarity producing current in said primary winding (4) flowing in the opposite direction opposite to said one direction.

* * * * *